United States Patent
Miller et al.

(10) Patent No.: US 10,202,171 B1
(45) Date of Patent: Feb. 12, 2019

(54) BOAT WITH RECONFIGURABLE RUNNING SURFACE FOR WAKE ADJUSTMENT

(71) Applicant: Correct Craft IP Holdings, LLC, Orlando, FL (US)

(72) Inventors: Eric Miller, Orlando, FL (US); William Snook, Orlando, FL (US)

(73) Assignee: Correct Craft IP Holdings, LLC, Orlando, FL (US)

( * ) Notice: Subject to any disclaimer, the term of this patent is extended or adjusted under 35 U.S.C. 154(b) by 0 days.

(21) Appl. No.: 15/477,720

(22) Filed: Apr. 3, 2017

Related U.S. Application Data (63) Continuation of application No. 14/218,723, filed on Mar. 18, 2014, now Pat. No. 9,611,006, which is a continuation-in-part of application No. 14/211,866, filed on Mar. 14, 2014, now Pat. No. 9,272,752.

(60) Provisional application No. 61/788,025, filed on Mar. 15, 2013, provisional application No. 61/791,080, filed on Mar. 15, 2013.

(51) Int. Cl.
| | | |
|---|---|---|
| *B63B 1/22* | (2006.01) | |
| *B63B 1/04* | (2006.01) | |
| *B63B 35/85* | (2006.01) | |
| *B63B 1/08* | (2006.01) | |
| *B63B 3/38* | (2006.01) | |
| *B63B 39/06* | (2006.01) | |
| *B63H 21/21* | (2006.01) | |

(52) U.S. Cl.
CPC .............. *B63B 1/22* (2013.01); *B63B 1/08* (2013.01); *B63B 3/38* (2013.01); *B63B 35/85* (2013.01); *B63B 39/061* (2013.01); *B63H 21/21* (2013.01); *B63B 2001/045* (2013.01); *B63B 2035/855* (2013.01); *B63B 2207/00* (2013.01); *B63B 2758/00* (2013.01)

(58) Field of Classification Search
CPC ............ B63B 3/38; B63B 35/816; B63B 1/04
USPC .................................................. 114/284, 285
See application file for complete search history.

(56) References Cited

U.S. PATENT DOCUMENTS

| | | |
|---|---|---|
| 893,642 A | 7/1908 | Murch |
| 2,505,520 A | 4/1950 | Bills |
| 2,899,925 A | 8/1959 | Meek |
| 2,970,636 A | 2/1961 | Haugland |
| 2,997,188 A | 8/1961 | Hauser |

(Continued)

FOREIGN PATENT DOCUMENTS

| | | |
|---|---|---|
| EP | 1435325 | 7/2004 |
| JP | 04071985 | 3/1992 |

(Continued)

OTHER PUBLICATIONS

Becker, Brett; The New Nautique Surf System: Surf on This!; http://features.boats.com/boat-content/2013/02/the-new-natique-surf-system-surf-on-this/; Feb. 19, 2013.

(Continued)

*Primary Examiner* — Anthony D Wiest
(74) *Attorney, Agent, or Firm* — Allen Dyer Doppelt & Gilchrist (57) ABSTRACT

A watersports boat includes a hull having an underside extending from a forward bow to n aft transom along a longitudinal centerline. The underside defines a running surface that contacts water when the hull moves therein. The underside includes one or more features that enhance the boat's performance.

14 Claims, 11 Drawing Sheets

(56) References Cited

U.S. PATENT DOCUMENTS

| | | |
|---|---|---|
| 3,034,470 A | 5/1962 | Vanderfeltz et al. |
| D195,068 S | 4/1963 | Griparis |
| 3,122,609 A | 2/1964 | Moore |
| 3,327,671 A | 6/1967 | Comins |
| 3,336,894 A | 8/1967 | Eisner |
| 3,352,275 A | 11/1967 | Wilson |
| 3,390,658 A | 7/1968 | Jelks |
| 3,503,358 A | 3/1970 | Moesly |
| 3,662,484 A | 5/1972 | Dres |
| 3,724,595 A | 4/1973 | Green |
| 3,811,143 A | 5/1974 | Page |
| 3,884,172 A | 5/1975 | Takahashi |
| 3,890,918 A | 6/1975 | Sell |
| 3,925,836 A | 12/1975 | Simmonds |
| 3,935,830 A | 2/1976 | Cox |
| 3,949,698 A | 4/1976 | Sell |
| 3,965,837 A | 6/1976 | Michael |
| 3,987,746 A | 10/1976 | McCulloh |
| 4,033,280 A | 7/1977 | Wood et al. |
| 4,163,529 A | 8/1979 | Krenzer et al. |
| 4,204,354 A | 5/1980 | Kane |
| 4,528,927 A | 7/1985 | Lizuka et al. |
| 4,561,375 A | 12/1985 | Paxton |
| 4,593,641 A | 6/1986 | Adams et al. |
| 4,641,597 A | 2/1987 | Paxton |
| 4,694,773 A | 9/1987 | Sparkes et al. |
| 4,893,577 A | 1/1990 | Jennings |
| 4,896,622 A | 1/1990 | Thomas |
| 5,018,474 A | 5/1991 | Jellen |
| 5,052,326 A | 10/1991 | Wiggen et al. |
| 5,092,260 A | 3/1992 | Mardikian |
| 5,105,754 A | 4/1992 | Collins |
| 5,169,348 A | 12/1992 | Ogiwara et al. |
| 5,193,478 A | 3/1993 | Mardikian |
| 5,215,025 A | 6/1993 | Talmor |
| 5,263,432 A | 11/1993 | Davis |
| 5,359,956 A | 11/1994 | Lee |
| 5,366,028 A | 11/1994 | Kobayashi |
| 5,417,178 A | 5/1995 | Harrelson, II |
| 5,453,572 A | 9/1995 | Kobayashi et al. |
| 5,520,139 A | 5/1996 | King et al. |
| 5,549,071 A | 8/1996 | Pigeon et al. |
| 5,645,003 A | 7/1997 | Grinde |
| 5,669,325 A | 9/1997 | Feikema |
| 5,673,507 A | 10/1997 | Stokes, Jr. |
| D395,866 S | 7/1998 | Fowler et al. |
| 5,787,835 A | 8/1998 | Remnant |
| 5,860,766 A | 1/1999 | Lochtefeld et al. |
| 5,878,686 A | 3/1999 | Anderson |
| 5,881,666 A | 3/1999 | Crews, Jr. |
| D409,972 S | 5/1999 | Todd |
| 5,934,217 A | 8/1999 | Alsop |
| 5,943,977 A | 8/1999 | Womack et al. |
| 5,979,350 A | 11/1999 | Larson et al. |
| 6,006,689 A | 12/1999 | Olofsson |
| 6,012,408 A | 1/2000 | Castillo |
| 6,044,788 A | 4/2000 | Larson et al. |
| 6,105,527 A | 8/2000 | Lochtefeld et al. |
| 6,138,601 A | 10/2000 | Anderson et al. |
| 6,148,756 A | 11/2000 | Pavlov et al. |
| 6,192,819 B1 | 2/2001 | Larson et al. |
| 6,216,622 B1 | 4/2001 | Lindstrom et al. |
| D442,910 S | 5/2001 | Metcalf |
| 6,374,762 B1 | 4/2002 | Larson et al. |
| 6,427,616 B1 | 8/2002 | Hagen |
| 6,439,150 B1 | 8/2002 | Murphy et al. |
| RE37,823 E | 9/2002 | Larson et al. |
| D465,194 S | 11/2002 | Eck |
| D468,254 S | 1/2003 | Eck |
| 6,505,573 B1 | 1/2003 | Sheikholeslam et al. |
| 6,520,104 B1 | 2/2003 | Svensson |
| 6,575,112 B2 | 6/2003 | Roeseler et al. |
| D482,649 S | 11/2003 | Eck |
| 6,666,159 B2 | 12/2003 | Larson et al. |
| 6,672,238 B2 | 1/2004 | Sheikholeslam et al. |
| D486,744 S | 2/2004 | Eck |
| 6,711,783 B2 | 3/2004 | LeMole |
| D489,314 S | 5/2004 | Metcalf |
| 6,792,888 B1 | 9/2004 | Metcalf |
| 6,834,607 B1 | 12/2004 | Johnson et al. |
| 6,854,413 B2 | 2/2005 | Jackson et al. |
| 6,865,999 B2 | 3/2005 | Bierbower, Jr. |
| 6,874,441 B2 | 4/2005 | Pigeon |
| 6,923,136 B1 | 8/2005 | D'Allessandro |
| 6,925,957 B2 | 8/2005 | Schultz |
| 6,945,188 B2 | 9/2005 | Eck et al. |
| 6,986,321 B2 | 1/2006 | Metcalf |
| 6,997,131 B2 | 2/2006 | Jackson et al. |
| 7,017,509 B2 | 3/2006 | Schultz |
| D519,910 S | 5/2006 | Bierbower, Jr. |
| 7,210,422 B1 | 5/2007 | Hickok et al. |
| 7,216,604 B2 | 5/2007 | Finney et al. |
| 7,219,617 B2 | 5/2007 | Metcalf |
| 7,234,408 B1 | 6/2007 | Clemmons et al. |
| 7,246,565 B2 | 7/2007 | Snook et al. |
| 7,299,761 B2 | 11/2007 | Larson et al. |
| 7,370,599 B1 | 5/2008 | Berman et al. |
| 7,392,758 B2 | 7/2008 | Metcalf |
| 7,418,918 B2 | 9/2008 | Bierbower et al. |
| 7,497,184 B1 | 3/2009 | Chaffin et al. |
| 7,536,971 B1 | 5/2009 | Fry |
| RE40,926 E | 10/2009 | Johnson et al. |
| 7,641,525 B2 | 1/2010 | Morvillo |
| 7,677,192 B2 | 3/2010 | Scism et al. |
| 8,240,268 B2 | 8/2012 | Hansen |
| 8,387,551 B2 | 3/2013 | Muller |
| 8,534,214 B1 | 9/2013 | Gasper et al. |
| 8,539,897 B1 | 9/2013 | Gasper et al. |
| 8,578,873 B2 | 11/2013 | Gasper et al. |
| 2001/0006037 A1* | 7/2001 | Badley .................. B63B 35/816 114/253 |
| 2005/0124234 A1 | 6/2005 | Sells et al. |
| 2007/0039536 A1 | 2/2007 | Kalil |
| 2007/0079744 A1 | 4/2007 | Craddock |
| 2008/0156250 A1 | 7/2008 | Clemmons et al. |
| 2008/0257247 A1 | 10/2008 | Crews |
| 2008/0264325 A1 | 10/2008 | Tevlin |
| 2009/0178604 A1 | 7/2009 | McKeand |
| 2009/0320738 A1 | 12/2009 | Blumberg |
| 2011/0017115 A1 | 1/2011 | Oloffson |
| 2011/0092113 A1 | 4/2011 | Mataya |

FOREIGN PATENT DOCUMENTS

| | | |
|---|---|---|
| JP | 05085468 | 4/1993 |
| JP | 07277274 | 10/1995 |
| JP | 2001213389 | 8/2001 |
| JP | 2001287693 | 10/2001 |
| JP | 2001294195 | 10/2001 |
| WO | WO2007072185 | 6/2007 |
| WO | WO2009113923 | 11/2009 |

OTHER PUBLICATIONS

Joystick Wakeboarding; URL www.joystickpylons.com; Dec. 12, 1998; archived by Waybackmachine at http://web.archive.org; 2 pages.
Jones, Alan; A Star is Born; Boating World; Sep. 1997, pp. 33-34.
Taco Supply, Division of Taco Metals, Inc.; Marine Catalog; 1987/1988; 5 pages.
FLF Films in Association With Wake Boarding Magazine; Hit It Water Sports Video; 1996.
Nordskog, Jerry; Publisher's Letter; Powerboat Magazine; Sep. 1995; 4 pages.
Powerboat Magazine; Five miscellaneous pages; Sep. 1995.
Wakeboarding Magazine; Three miscellaneous pages; Jun. 1994.
Wakeboarding Magazine; Two miscellaneous pages; Fall, 1993.
Merced, CA (Vocus); Malibu Makes Boating Easier and More Fun With MaliView; http://www.prweb.com/releases/malibu/boates/prweb1285684.htm; Seven pages; Sep. 4, 2008.
Volvo Penta Marine Accessories; QL Boat Trim System; www.qlmarine.com.

(56) References Cited

OTHER PUBLICATIONS

Humphree; Innovative Technology for Speed at Sea.
QL Marine Accessories, Volvo Penta; User and Installation Instructions for QL Boat Trim System.
Humphree; Diagram for Quick Installation Guide.
Petition for Inter Partes Review of U.S. Pat. No. 8,539,897; Filed Jun. 27, 2014.
Mastercraft Surf Tabs; https://www.youtube.com/watch?v=b1Q_MLRO31M.
Williams, David; First Look: Nautique Surf System; Wake World; www.wakeworld.com/news/feature/first-look-nautique-surf-system.html; Jan. 16, 2013.

* cited by examiner

BOAT WITH RECONFIGURABLE RUNNING SURFACE FOR WAKE ADJUSTMENT

CROSS-REFERENCE TO RELATED APPLICATIONS

This is a continuation of U.S. patent application Ser. No. 14/218,723 filed on Mar. 18, 2014, which is a continuation-in-part of application Ser. No. 14/211,866, filed Mar. 14, 2014, which claims priority to U.S. Provisional Application Ser. No. 61/788,025, filed Mar. 15, 2013. This also claims priority to U.S. Provisional Application Ser. No. 61/791,080, filed Mar. 15, 2013 the entire contents of which are herein incorporated by reference in their entirety.

FIELD OF THE INVENTION

The invention relates to the field of boats and, more particularly, to watersports boats for skiing and wake sports.

BACKGROUND OF THE INVENTION

The shape of a boat's hull determines how it travels through the water and the activities for which it is suited. The shape is generally chosen to fit within desired load carrying, stability, speed, and hydrodynamic parameters for the boat's intended purpose. As a boat travels through the water, its motion is typically described by one of two general modes of operation: (1) pre-planing mode, including displacement mode and semi-planing or transition mode, and (2) planing mode. How a boat transitions between these operational modes and how it behaves within a particular operational mode is a function of the shape of the hull.

In displacement mode, when the boat is moving relatively slowly through the water, the primary force that keeps the boat from sinking is buoyancy. When operating in displacement mode, the bow of the boat is typically raised out of the water while the stern is pressed down into the water.

In semi-planing mode, the hull is traveling at sufficient speed to generate a moderate amount of hydrodynamic lift, but the primary force that supports the boat's weight is still buoyancy.

In planing mode, the hull generates even more lift so that the primary forces supporting the boat's weight are hydrodynamic rather than buoyant. These hydrodynamic forces tend to lift the running surface out of the water, thereby reducing drag.

Certain hull designs are specifically geared to perform in only one of these three operational modes. However, boats that are designed for skiing or wake sports water should be configured to operate well in all three modes so that the boat is adaptable to different activities such as cruising, waterskiing, wakeboarding, and/or wake surfing. For example, it may be best to operate in displacement or semi-planing mode when pulling a wakeboarder, because the wake produced in these modes is typically more substantial than the wake produced in planing mode. In contrast, for waterskiing, it may be best to operate in planing mode so that the wake is as small as possible. Often times, individual water sports performers will even prefer for the wake to be tuned to their particular preferences. Unfortunately, although many water sports boats operate well through all three operational modes, there are still very few boats that are capable of fine-tuning the wake pattern to meet each performer's personal preferences.

SUMMARY

We have overcome these drawbacks by inventing a boat hull having a re-configurable running surface.

In an exemplary embodiment, the watersports boat includes a hull having an underside extending from a forward bow to an aft transom along a longitudinal centerline. The underside defines a running surface that contacts water when the hull moves therein. An aft running surface section of the hull has: a trailing edge forming an aft-most point of the contact with water along any given buttock line of the hull when the hull is moving forward; a non-repositionable aft running surface section forming a first portion of the trailing edge; and a re-positionable aft running surface section forming a second portion of the trailing edge. The first portion of the trailing edge and second portion of the trailing edge meet substantially co-linear with one another.

In another embodiment of the watersports boat, the aft running surface section of the hull includes port and starboard recesses formed in opposed corners of the aft running surface section and spaced outboard the centerline. Each of the recesses extends from a respective step at a forward end thereof aft to a respective aft edge thereof. The steps form the planing mode trailing edge where water disengages from the aft corners of the aft running surface section when the boat travels in planing mode. The aft edge of the recesses form the pre-planing mode trailing edge where water disengages from the aft corners of the aft running surface section when the boat travels in pre-planing mode.

In another embodiment of the watersports boat, the running surface includes a bow section and port and starboard midship running surface sections that flatten moving aft to an aft running surface section. The port and starboard midship running surface sections are separated by a keel member. The keel member has an apex lower than the aft running surface section and that inclines toward the aft running surface section aft the apex and forward a propeller positioned beneath the aft running surface section.

DETAILED DESCRIPTION OF EMBODIMENTS

In the Summary and in the Detailed Description of Embodiments, reference is made to particular features, including method steps. Where a particular feature is disclosed in the context of a particular aspect or embodiment, that feature can also be used, to the extent possible, in combination with and/or in the context of other aspects and embodiments.

Figure 1:
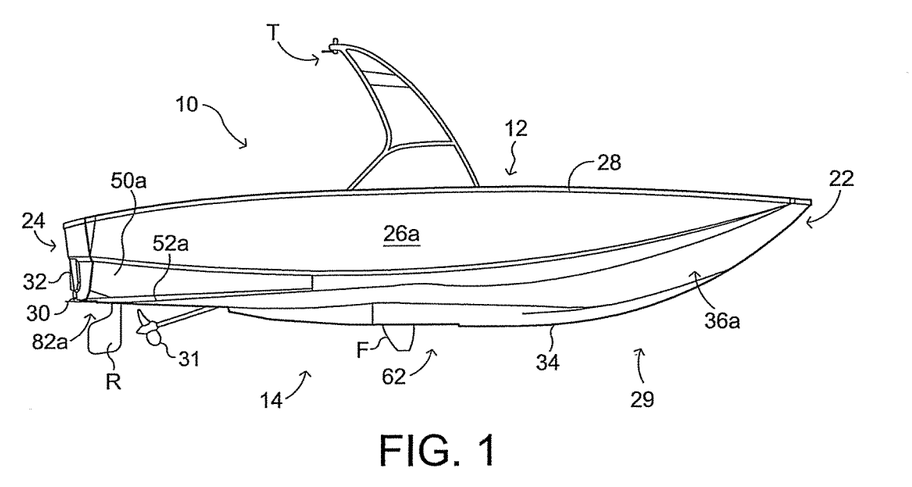
FIG. 1 is a starboard side elevation view of a boat hull in accordance with an embodiment.
Figure 2:
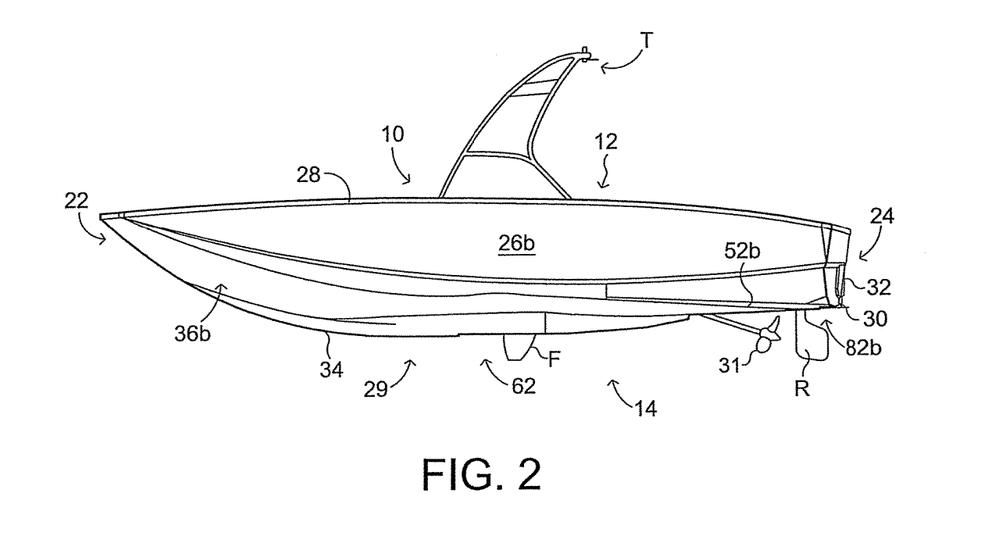
FIG. 2 is a port side elevation view of the hull of FIG. 1.
Figure 3A:
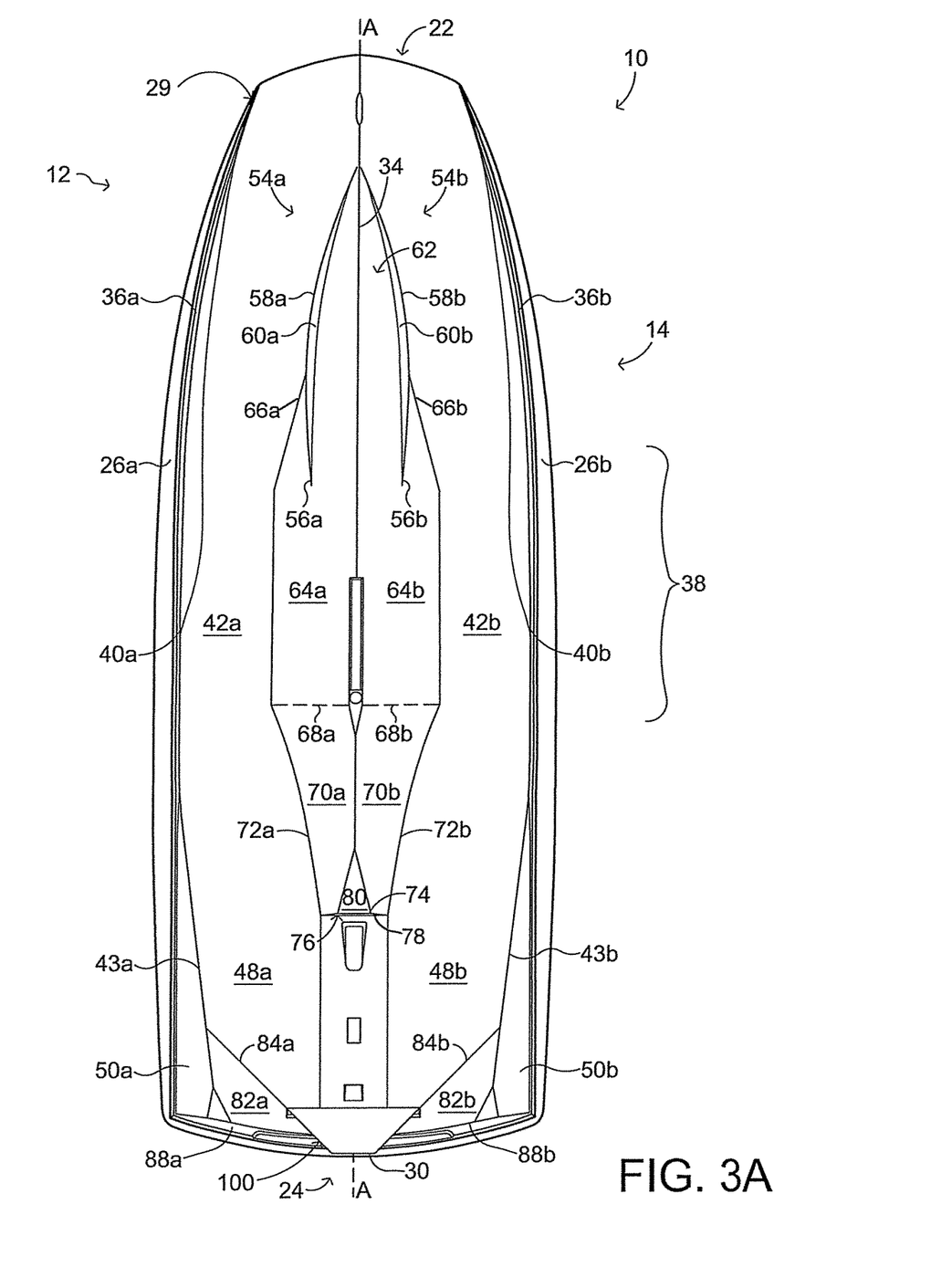
FIG. 3A is a bottom plan view of the hull of FIG. 1.
Figure 3B:
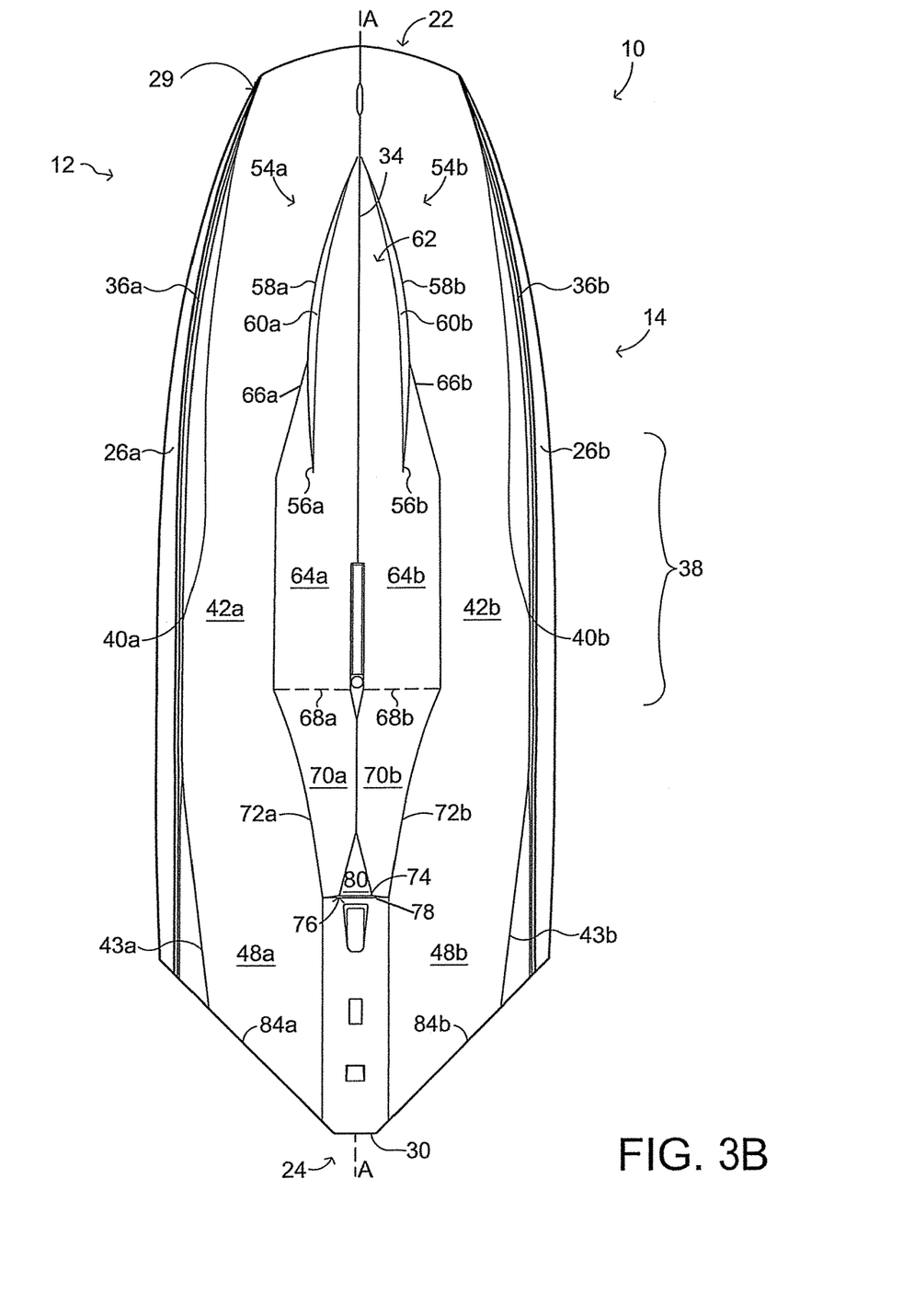
FIG. 3B is a bottom plan view of another hull embodiment.
Figure 4:
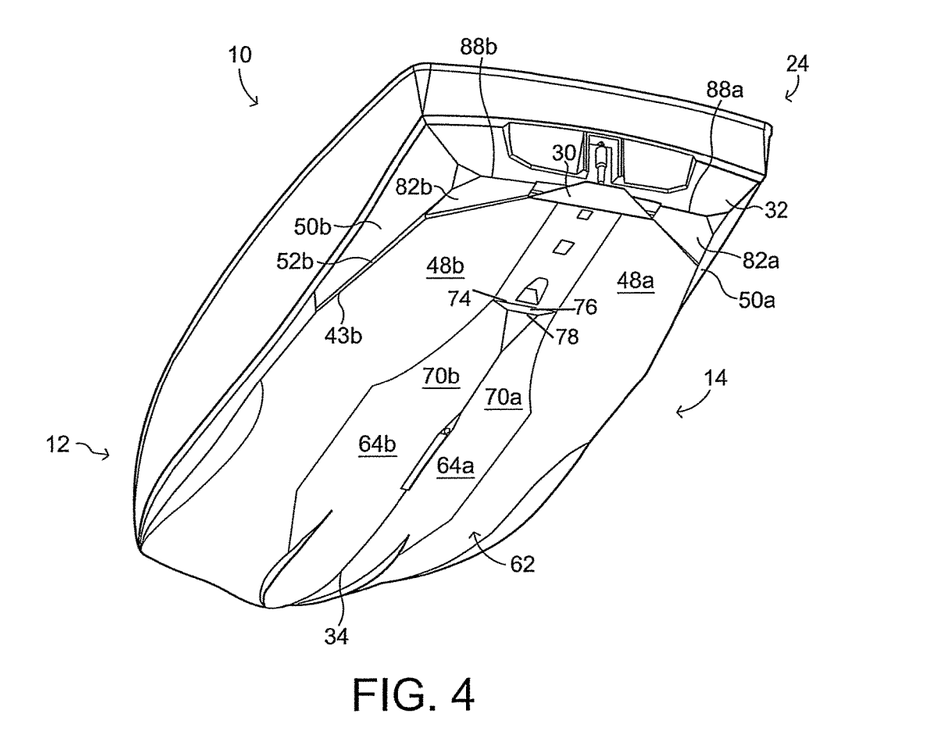
FIG. 4 is a port and aft perspective view of the hull of FIG. 1.

In this section, embodiments will be described more fully. These embodiments may, however, take many different forms and should not be construed as limited to those set forth herein. An exemplary embodiment of the watersports boat 10 is generally shown in FIGS. 1-4. As best seen from FIGS. 1 and 2, the boat's hull 12 extends longitudinally between a bow 22 and a stern 24 and laterally between a starboard hull side 26a and a port hull side 26b. The hull 12 also extends vertically from a topside 28 downwardly to a hull underside 29, which defines a running surface 14 that contacts the water as boat moves across it. The running surface 14 is advantageously designed to provide small wakes for waterskiing, medium wakes for wakeboarding, and large wakes for wake surfing. As shown in FIGS. 3A and 3B, the port and starboard sides are separated by an imaginary axis A, or hull centerline, longitudinally dividing the hull 12 in half from stem to stern. A keel 34 runs along the axis A.

A propulsion mechanism such as a boat engine, preferably an inboard engine with a propeller 31 extending outwardly and aft from the hull underside 29, will generally be used to propel the boat 10 through the water. A rudder R and bottom fin F may also be included for boat control.

As best shown in FIGS. 3A,B-6, the hull underside 29, includes a starboard side reverse chine 36a and port side reverse chine 36b that extend longitudinally beneath their respective hull sides 26a, 26b and between the bow 22 and a midship section 38. The chines 36a, 36b stabilize the hull 12 by allowing air to channel down the starboard and port sides to provide an equal and stable lift along both side of the hull 12 at slower speeds. At slower speeds, the reverse chines 36a, 36b creates a higher bow lift, which presses the stern 24 into the water and increases size of the wake the hull 12 produces.

The reverse chines 36a, 36b gradually terminate at the midship section 38 at respective reverse chine terminal ends 40a, 40b. The reverse chines 36a, 36b taper outwardly towards the respective port or starboard hull side 26a, 26b as they approach the terminal ends 40a, 40b and gradually flatten where the terminal ends 40a, 40b meet port and starboard side midship running surfaces 42a, 42b. More conventional port and starboard chines 43a, 43b extend aft to the transom 32.

Respective starboard and port side aft running surfaces 48a, 48b extend aft from the midship section 38 and taper inboard as they approach the transom 32.

As best shown in FIGS. 3A, 3B, 4, 8, and 9, a pair of opposed aft hull side surfaces 50a, 50b are vertically positioned between the hull sides 26a, 26b and the hull underside 29. The aft hull side surfaces 50a, 50b angle inwardly and downwardly toward the axis A and the transom 32.

A pair of opposed substantially vertical walls 52a, 52b are positioned between the aft hull side surfaces 50a, 50b and the hull bottom 29. The aft hull side surfaces 50a, 50b, respectively, from a common boundary with the port and starboard variable planing surface 82a, 82b recesses.

Figure 6:
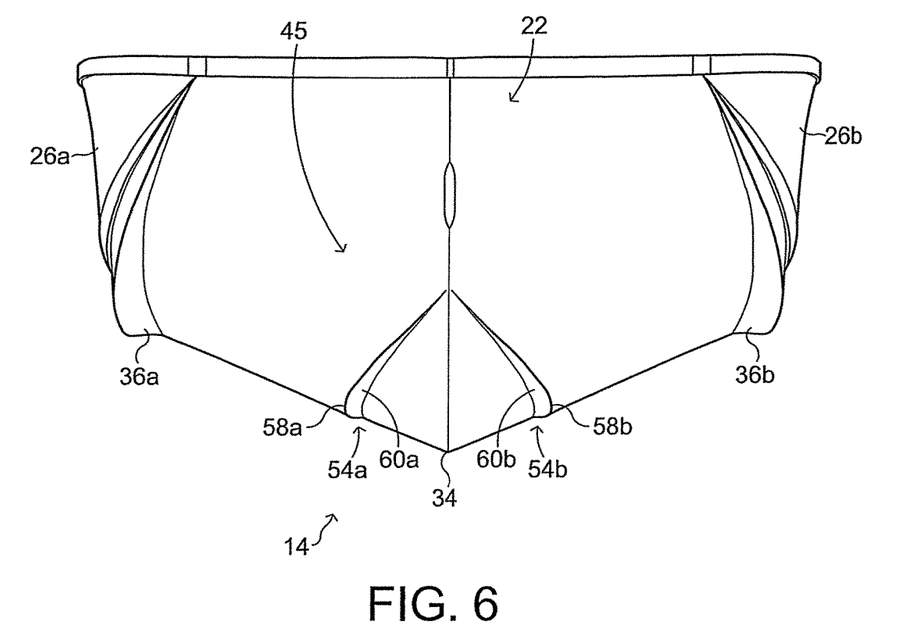
FIG. 6 is a front elevation view of the hull of FIG. 1.
Figure 7:
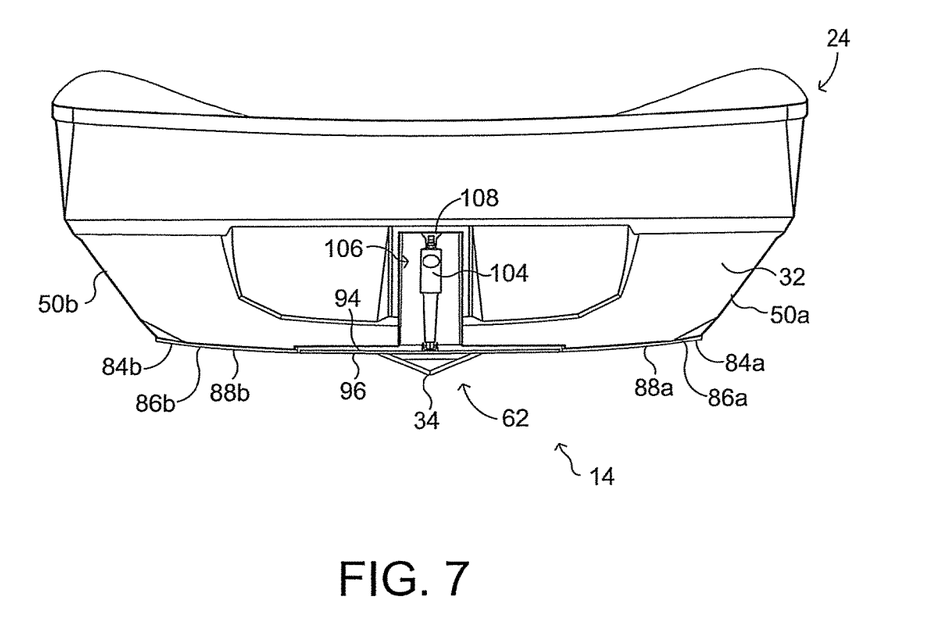
FIG. 7 is a back elevation view of the hull of FIG. 1.
Figure 8:
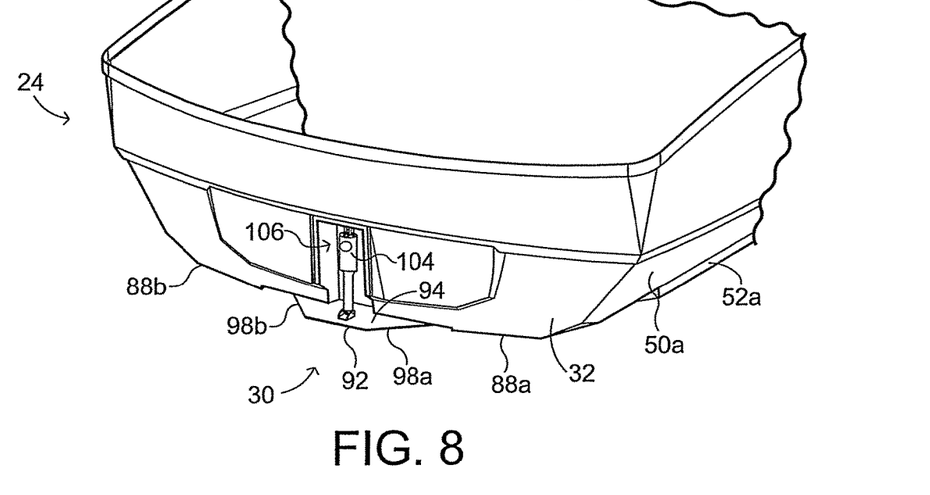
FIG. 8 is a partial enlarged starboard, aft, and topside perspective view of the hull of FIG. 1.
Figure 9:
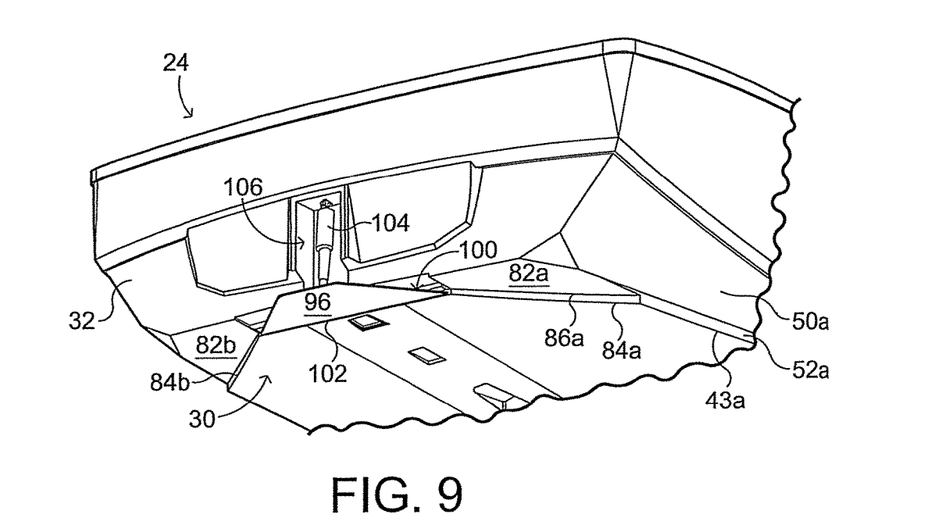
FIG. 9 is a partially enlarged starboard, aft, and bottom perspective view of the hull of FIG. 1.

At the bow 22, as best shown in FIGS. 3A, 3B and 6, a pair of opposed starboard and port-side strakes 54a, 54b extend outwardly and aft about the keel 34 towards the midship section 38. The strakes 54a, 54b terminate at respective strake terminating ends 56a, 56b. Between the bow 22 and the strake terminating ends 56a, 56b, the strakes 54a, 54b substantially form a V shape. The strakes 54a, 54b are further defined by longitudinal strake edges 58a, 58b and longitudinal strake walls 60a, 60b.

A V-shaped keel member 62 is positioned about the midship section 38 and extends longitudinally towards the stern 32 and essentially protrudes from the hull underside 29 symmetrically about the axis A. The keel member 62 includes a starboard side forward keel member surface 64a and a port side forward keel member surface 64b. Both forward surfaces 64a, 64b extend from their respective forward surface edges 66a, 66b at an angle downward from the hull bottom 29 and meet at an apex at the keel 34. The apex is lower than the aft running surface sections 48a, 48b. The keel member 62 inclines toward the aft running surface sections 48a, 48b aft the apex.

The keel member 62 separates port and starboard midship running surface sections 42a, 42b, which gradually flatten moving aft from the V-shaped bow running surface section 45 to meet the aft running surface sections 48a, 48b.

The forward keel member surfaces 64a, 64b terminate at corresponding lateral edges 68a, 68b from which rearward keel member surfaces 70a, 70b extend. The rearward keel member surfaces 70a, 70b extend from their respective rearward keel member surface edges 72a, 72b and angle downwardly from the hull underside 29 and meet at an apex at the keel 34. The rearward protrusion surface edges 72a, 72b angle inwardly towards the keel 34 and terminate at a lower edge 74, defining a lower edge of a step 76 formed between the lower step edge 74 and an upper step edge 78. The step 76 vertically offsets the rearward keel member surfaces 70a, 70b from the portion of the hull underside 29 that extends the remainder of the distance to the transom 32.

FIG. 3B shows an alternate embodiment of the hull 10 where the running surface extension member 30 is a static integral piece of the running surface 14. The recesses 82a, 82b are also not present.

Forward of the upper step edge 78 the rearward keel member surfaces 70a, 70b split apart from the keel 34 to define outer longitudinal edges of a substantially triangular surface 80, which angles upwardly towards the stern 24.

Figure 5:
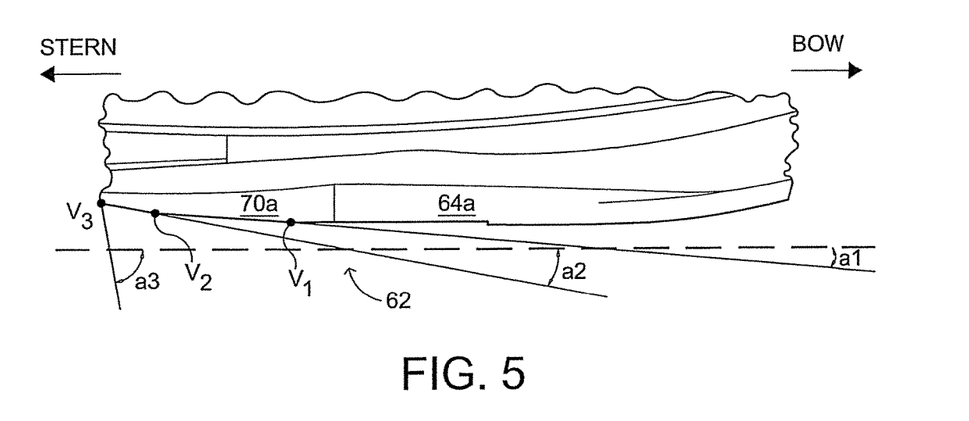
FIG. 5 is a partial enlarged starboard elevation view of the hull of FIG. 1.

An enlarged view of the hull 12 at the position of the keel member 62 is provided in FIG. 5 so that one possible shape of the keel member 62 in this embodiment is clearer. In FIG. 5, the apex of the keel member 62 along the keel 34 defines a portion of the lower silhouette of the hull underside 29. Moving aft, the keel 34 along the keel member 62 angles upwardly between the midship section 38 and the stern 24.

Although it is not always necessary, in this embodiment, the keel 34 angles upwardly at three distinct vertices V1, V2, V3 characterized by angles $\alpha 1$, $\alpha 2$, and $\alpha 3$ relative to horizontal, which is represented by the broken line. The degree of angles A1, A2, and A3 successively increases moving aft.

The keel of a conventional powerboat used for tow-based water sports is typically more or less horizontal along the midship and stern sections. These horizontal keels are not optimal for producing the larger wakes preferred by wakeboarders and/or wakesurfers, for example, because the horizontal rear portion of the running surface creates lift as the boat travels through the water with a bow up attack angle. The keel member 62, more particularly the upwardly angled keel 34 on the V-shaped keel member 62, presents a lower attack angle to the water for the same attitude as the conventional hull. Thus, the upwardly angled keel 34 reduces the lift created by this section of the running surface 14, thereby allowing the stern 24 to sit lower in the water for producing a larger wake relative to a conventional boat.

Aft of the V-shaped keel member 62, the hull underside 29 includes a pair of variable planing surfaces 82a, 82b respectively positioned on starboard and port sides of the axis A. The variable planing surfaces 82a, 82b are recesses in the hull underside 29. The forward boundary of the variable planing surfaces 82a, 82b is a leading edge 84a, 84b which extends inboard from the respective starboard or port side towards the axis A. The leading edges 84a, 84b also extend aft towards the transom 32 as shown. The leading edges 84a, 84b are vertically offset from their respective variable planing surfaces 82a, 82b by a variable planing surface vertical wall 86a, 86b that spans between the leading edges 84a, 84b and the variable planing surfaces 82a, 82b.

Each variable planing surface 82a, 82b extends aft from the leading edge 84a, 84b to a trailing edge 88a, 88b formed along the transom 32.

Figure 11:
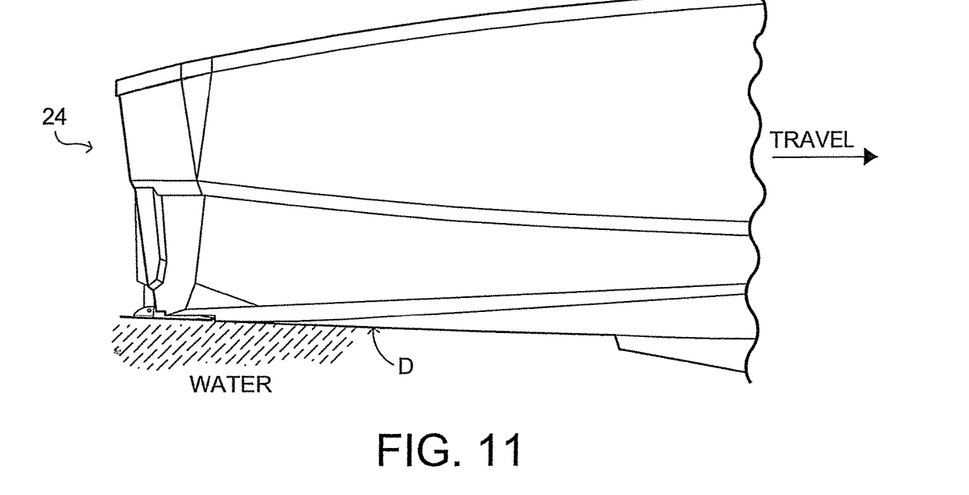
FIGS. 11 and 12 are partial enlarged starboard side elevation views of the stern of the hull of FIG. 1, showing the boat at different angles of attack.
Figure 12:
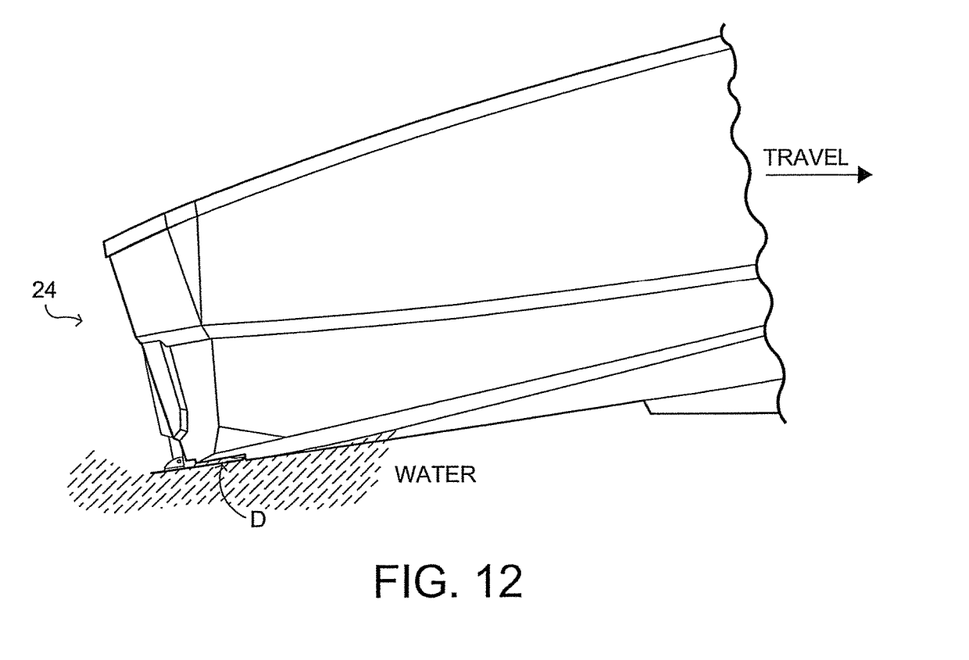

The variable planing surfaces 82a, 82b and their corresponding leading 84a, 84b and trailing edges 88a, 88b provide several advantageous functions. The variable planing surfaces 82a, 82b form a pair of air channels along the running surface 14. As shown in FIGS. 11 and 12, when the boat 10 is travelling in pre-planing mode the stern 24 is relatively low such that the water flowing through the recesses loses contact with the hull 12 at the trailing edges 88a, 88b, which are also referred to as the pre-planing mode trailing edges. This operational mode creates larger wakes that are geared for wakeboarding and/or wakesurfing. In contrast, when the boat 10 is operating in planing mode, the angle of attack is relatively low such that the water flowing through these channels loses contact with the hull underside 29 at the leading edges 84a, 84b, which are also referred to as planing mode trailing edges. During planing mode, the trailing edges 88a, 88b are above a planing waterline of the hull 12. This allows air to ventilate the recesses preventing water from reattaching to the variable planing surfaces 82a, 82b as the boat is planing.

Details associated with the running surface extension member 30 are best shown in FIGS. 7-10. The running surface extension member 30 is positioned about the axis and extends about a medial section of the aft running surface sections 48a, 48b rearwardly from the stern and, preferably, beyond the transom 32. The running surface extension member 30 may be fixed or pivotable relative to the axis A. In the embodiment, shown, the running surface extension member 30 is pivotable for added boat control.

The running surface extension member 30 is pivotably coupled to the hull 12 adjacent the transom 32 and extends aft relative to the leading edges 84a, 84b. The extension member 30 includes a forward terminal edge 90 that is aligned with and intersects each leading edge 84a, 84b and aft terminal edge 92. An extension member top surface 94 and an extension member bottom surface 96 extend generally parallel between the forward terminal edge 90 and aft terminal edge 92. A pair of opposed longitudinal extension member edges 98a, 98b define lateral edges of the extension member 30.

In the embodiment shown, the extension member 30 has a generally trapezoidal shape so that the leading edges 84a, 84b and longitudinal extension member edges 98a, 98b are substantially aligned and co-linear and so that the angle between the extension member's forward terminal edge 90 and longitudinal extension member edges 98a, 98b is substantially supplementary to the angle between the extension member's forward terminal edge 90 and the leading edges 84a, 84b. If the shape of the variable planing surface 82a, 82b is changed, however, it may be desirable to change the shape of the extension member 30 such that the longitudinal extension member edge 98a, 98b/forward terminal edge 90 angle and forward terminal edge 90/leading edge 84a,84b angles are supplementary. This arrangement is particularly advantageous as it allows the extension member bottom surface 96 to function as part of the running surface 14.

The extension member 30 may be coupled to the hull 12 about the stern 24 or transom 32 and adjacent or against the hull underside 29. In the embodiment shown, the forward terminal edge 90 is received in a extension member receiving area 100 that is recessed into the underside 29 and continues to transom 32. The receiving area 100 has a generally rectangular shape, which is substantially centered along the axis A and is recessed further into the underside 29 than the variable planing surfaces 82a, 82b.

The extension member is positioned symmetrically about the axis A and is configured to pivot at an angle relative to the axis A. The extension member 30 is pivotably coupled to the hull 12 by a hinge 102.

Suitable means for moving the extension member 30 include actuators such as motors, servos, or the like. In the exemplary embodiment, the actuator 104 is a hydraulic ram. The actuator 104 is positioned in an actuator receiving area 106 that is recessed into the transom 32 and is attached to the hull 12 at a first bracket 108. The actuator 104 is attached to the running surface extension member 30 at a second bracket 110.

Figure 10:
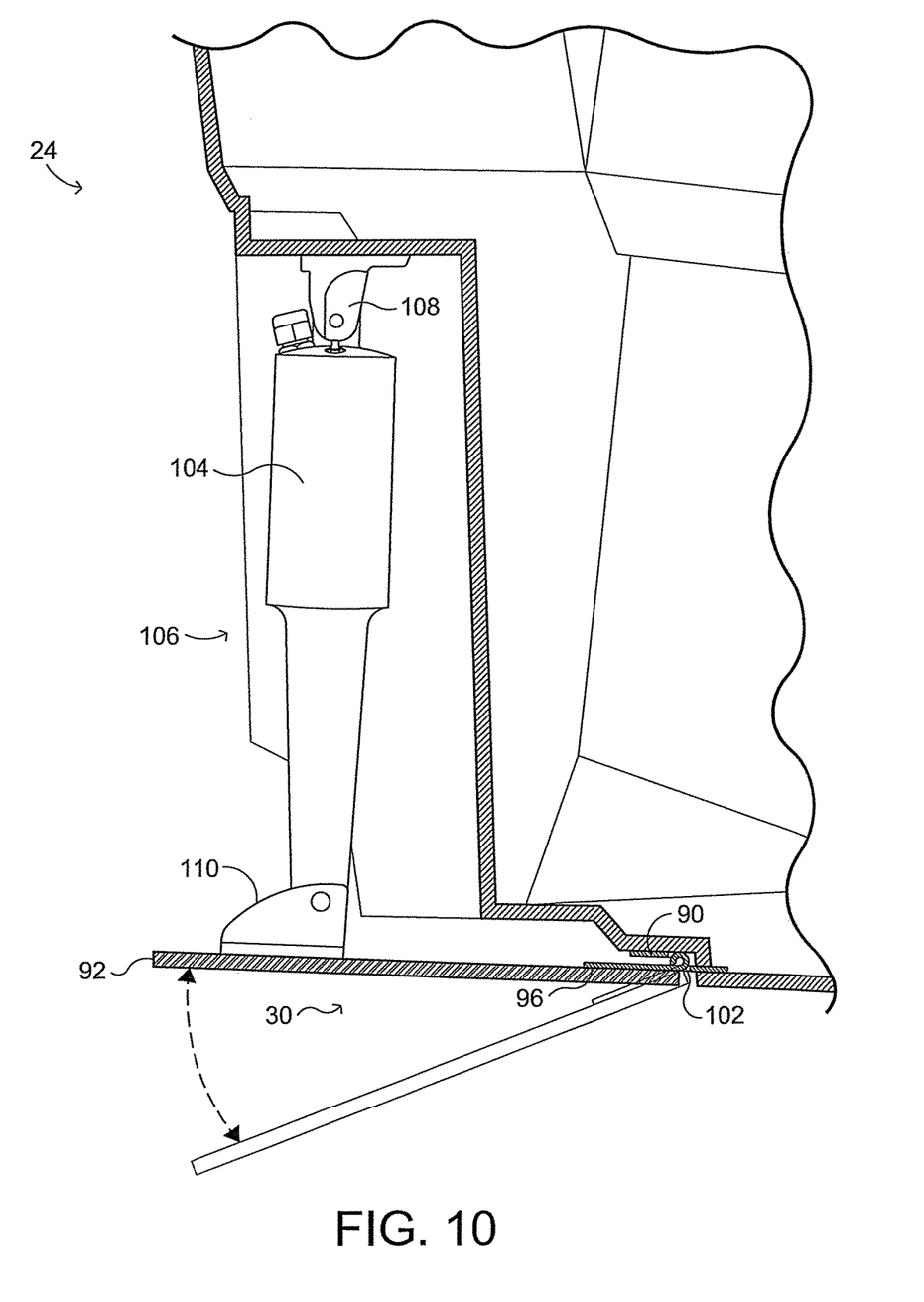
FIG. 10 is a partial enlarged starboard cross-section view of the stern of the hull of FIG. 1, illustrating an example of movement of the running surface extension member.

The actuator 104 is configured to move the extension member 30 from a retracted position to an extended position. As best shown in FIG. 10, in the retracted position, the bottom surface 96 is substantially co-planar with a medial section of the aft running surfaces 48a, 48b. In the extended position, the bottom surface 96 extends below the underside 29 of the hull 12 as illustrated by the dashed lines to interrupt water flowing past the stern 24 and generate lift. The angular displacement between the retracted position and the extended position may be, for example, between 0 to 90 degrees, 0 to 45 degrees, and/or, 0 to 30 degrees.

The extension member 30 essentially functions as a re-positionable portion of the running surface 14 at the medial position of the stern 24. As mentioned, it may alternatively be a fixed piece of the same shape, but the fixed piece would not provide as many options for boat control. By extending the extension member 30 from the retracted position, the operator is able to add lift to the stern 24, helping shape the wake and achieve planing mode faster.

Figure 13:
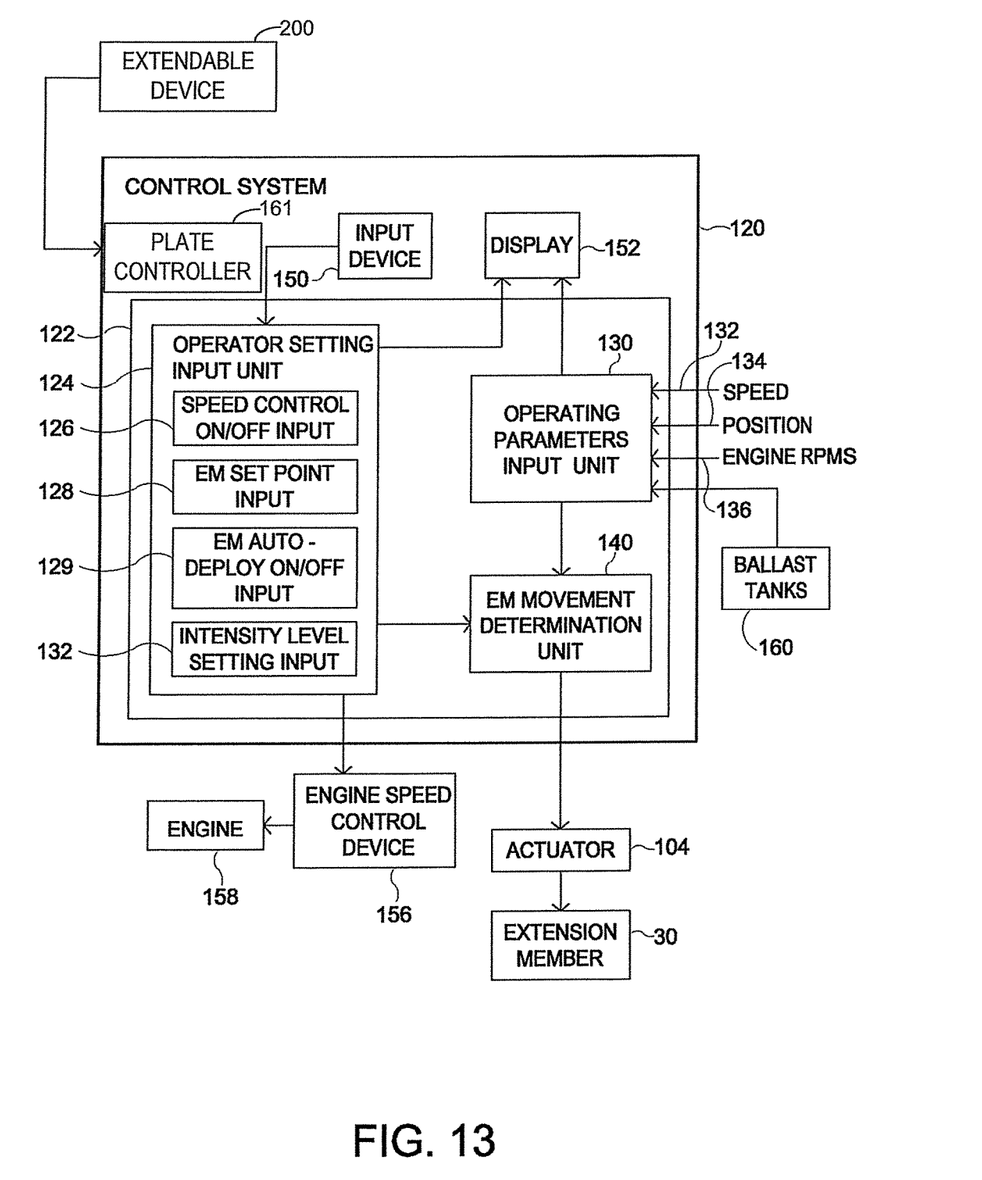
FIG. 13 is a block diagram illustrating a control system embodiment.

The operator may control the position of the extension member 30 incrementally to achieve the desired performance. Aspects of the extension member control system are shown in FIG. 13, the actuator 104 is in signal communication with an electronic control system 120 for adjusting the angle of the extension member 30.

The control system 120 includes a controller 122 coupled to the extension member 30 via the actuator 104. The controller 122 may be configured as a computer processor, for example, and includes an operator setting input unit 124, a boat operating parameters input unit 130, and an extension member movement determination unit 140.

The operator setting input unit 124 receives inputs from the operator of the boat 10 via an operator input device 150 coupled thereto. The operator setting input unit 124 includes a speed control on/off input 126, an extension member set point input 128, an extension member auto deploy on/off input 129, and an intensity level setting input 132.

The speed control on/off input 126 is used to turn on and off speed control of the boat 10, and when turned on, sets the boat 10 to a desired speed via an engine speed control device 156 coupled to the boat engine 158.

The extension member set point input 128 corresponds to an extension member set point operational mode, where the extension member 30 is set to an operator defined position once the desired speed of the boat has been reached.

The extension member 30 auto deploy on/off input 130 determines whether an extension member auto deploy mode is on or off. In extension member auto deploy mode, the control system 120 automatically adjusts the of the extension member 30 as the boat accelerates to assist with planing.

The intensity level setting input 132 determines how quickly the position of the extension member 30 is adjusted while in the auto deploy mode.

The boat operating parameters input unit 130 receives inputs on the different operating parameters of the boat 10. For example, speed and position of the boat are received via inputs 132 and 134 and engine RPMs are received input 136. A level of the ballast tanks 160 is also received via input 138 from a level sensor associated with the ballast tanks 160. Speed and position of the boat 10 may be provided by a global positioning system (GPS), for example. Display of the various settings and operating modes is provided to the operator via a display 152 coupled to the operator setting input unit 124 and to the boat operating parameters input unit 130.

The extension member movement determination unit 140 is for controlling movement of the extension member 30. The extension member movement determination unit 140 receives inputs from the operator setting input unit 124 and the boat operating parameters input unit 130. In particular, the extension member 30 is moved to pre-determined percentages of the rotation range of the extension member 30 as the speed of the boat 10 increases to a desired boat speed setting.

The two different operating modes of the control system 120 will now be discussed in greater detail. When the auto deploy on/off input 129 receives an input signal via the input device 150, the auto deploy mode is activated. The auto deploy mode is primarily used to adjust the position of the extension member 30 when the boat moves from displacement mode to planing mode to help the boat reach planing mode and stay in planing mode. In auto deploy mode, the control system 120 automatically adjusts the position of the extension member 30 so that the operator does not have to do so manually.

In auto deploy mode, the position of the extension member 30 is moved to a predetermined percentage of the rotation range of the extension member 30 based on the speed of the boat 10, the intensity level setting 132 and the ballast tank level threshold of the ballast tanks 160. As the speed of the boat 10 increases to the desired boat speed setting, the extension member 30 is moved to at least one next predetermined percentage of the full rotation range. By way of example, the extension member 30 may move within a range of 30 degrees so that a position target of 50% corresponds to 15 degrees.

One way this can be accomplished is by programming different sets of position targets, where the predetermined percentages of the rotation range of the extension member 30 are different for each set. The boat speed is thus separated into boat speed interval ranges. The predetermined percentages of the rotation range of the extension member 30 may be different for each set because of the different combinations of the intensity level and the ballast tank level threshold. The intensity level setting may include a high intensity level setting that increases the predetermined percentage of the rotation range, and a low intensity level setting that decreases the predetermined percentage of the rotation range. If the level of the ballast tanks 160 is less than the ballast tank level threshold, then the predetermined percentage of the rotation range may be decreased. If the level of the ballast tank 160 is greater than the ballast tank level threshold, then the predetermined percentage of the rotation range may be increased. By way of example, the ballast threshold may correspond to a percentage, 50% for example, of the total allowable sum of the ballast tanks 160. If the ballast tanks 160 hold 1900 pounds of water, for example, then the ballast threshold level is 950 pounds at the 50% setting.

The control system 120 automatically transitions from auto deploy mode to set point mode once the desired set speed of the boat 10 is reached. After the boat 10 has reached the desired boat speed setting, the extension member 30 is moved to a desired position based on an extension member set point value. The operator provides the set point value to the extension member set point input 128 via the input device 150. The set point value corresponds to one of several possible inputs between a minimum and a maximum.

The entered set point value corresponds to the final position of the extension member 30 once the desired speed of the boat 10 is reached. This set point value is manually entered, or alternatively, may be entered based on a user profile. Each set point value corresponds to an extension member 30 position that is somewhere between the fully retracted position and fully extended position.

The interface between the extension member movement determination unit 140 and the actuator 104 is based on an electronic signal sent to the actuator 104 that corresponds to a specific extension member 30 position. The electronic signal can either be in the form of a continuous signal or a pulsed signal. In either case, the total duration of the continuous signal or the sum of the duration of the pulse signals determine how far the actuator extends and, therefore, the extension member 30 position.

The set point input 128 may have again value associated with the set point values to allow the extension member 30 to be adjusted by larger or smaller increments, depending on the boat's speed. For example, if the speed is less than a boat speed threshold, such as 13.0 mph for example, the electronic signals corresponding to the different set point values cause the extension member 30 to be moved less. Once the boat speed is greater than a certain desired value then no adjustments are made to the electronic signal durations.

The same is true for when the speed control is off. In other words, if the desired boat speed setting is less than the boat speed threshold, then the controller 122 may be further configured to move the extension member 30 to a position less than the desired position after the boat 10 has reached the desired boat speed setting.

In addition, if the speed of the boat 10 is reduced after reaching the desired boat speed setting after the extension member 30 has been moved to a desired position, then the controller 122 is further configured to move the extension member 30 to a predetermined percentage of the full rotation range between the fully retracted and fully extended positions. In other words, auto deploy mode may be re-activated if the boat drops below the desired boat speed setting.

The operator of the boat 10 can also interact with the control system 120 in an indirect way by turning off the speed control. Here, the control system 120 uses an artificial set speed as a replacement for all extension member set point values. The artificial set speed is determined by the condition of intensity level setting and the ballast tank level threshold.

A method of operating the boat 10, which associated with using the control system 120 is now described. From the start the method includes receiving as input a desired boat speed setting and at least one extension member set point value corresponding to a desired extension member position. The extension member 30 is moved to a predetermined percentage of the rotation range based on a ballast tank level threshold of the ballast tanks 160 and based on a current speed of the boat 10. As the current speed of the boat 10 increases to the desired boat speed setting, then the extension member 30 is moved to at least one next predetermined percentage of the rotation range. The method further includes moving the extension member 30 to the desired extension member position based on the at least one entered extension member set point value after the boat 10 has reached the desired boat speed setting.

As discussed, the boat 10 has a reconfigurable running surface 14 designed to provide an optimized wake for many different watersports such as skiing, wakeboarding and/or wakesurfing. The running surface 14 is reconfigurable because water attaches to different parts of it depending on the boat's angle of attack, which is essentially an acute angle formed between the water and the bow 22. In displacement mode, the angle of attack will generally be larger than in planing or pre-planing mode.

According to this principle, a method of modifying the wake produced by the boat 10 includes imparting to the boat a first angle of attack wherein water attaches to the aft running surface sections 48a, 48b and breaks off at the transom 32 and imparting to the boat a second angle of attack wherein water breaks off the respective leading edges 84a, 84 of the port and starboard side recesses of the variable planing surfaces 82a, 82b. The second angle of attack may be achieved by lowering the bow 22 relative to the water's surface, which in turn raises the stern. In this case, the first angle of attack would produce a higher wake than the second angle of attack.

Figure 14:
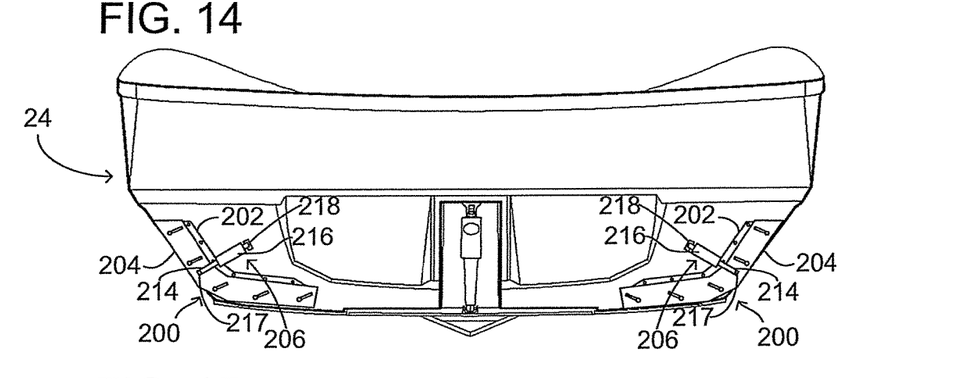
FIG. 14 is a back elevation view of the hull of FIG. 1 and with a pair of extendable devices in the stowed position.
Figure 15:
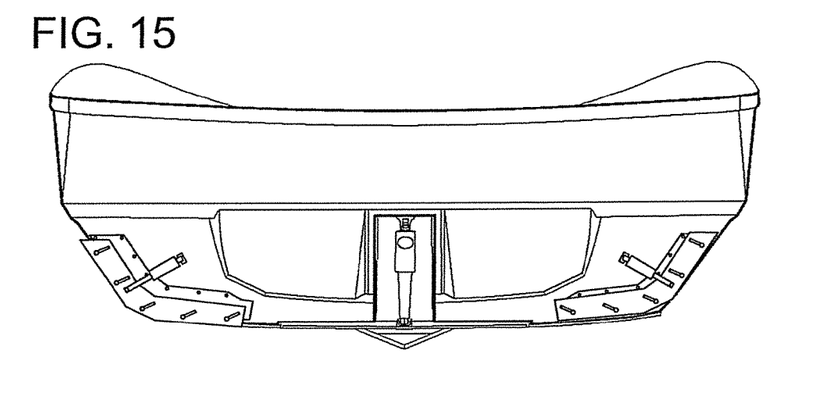
FIG. 15 is a back elevation view of the hull of FIG. 14 and with the port side extendable device in the active position.
Figure 16:
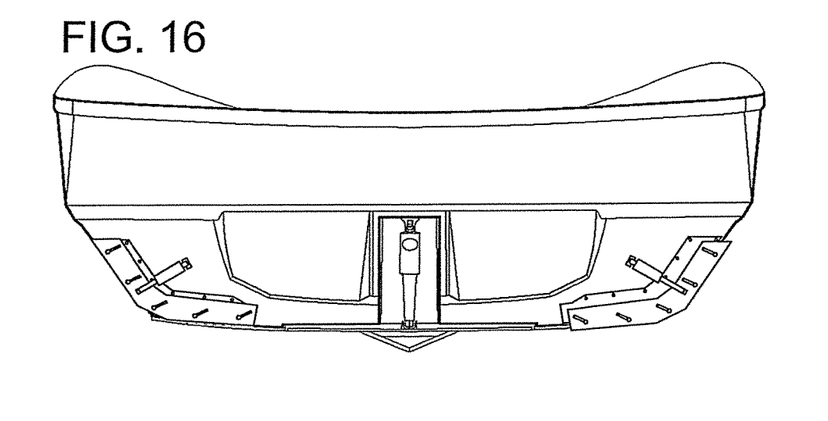
FIG. 16 is a back elevation view of the hull of FIG. 14 and with the starboard side extendable device in the active position.

If further boat configurability is desired, the boat 10 may also be equipped with a plurality of extendable devices. FIGS. 14-16 show exemplary extendable devices 200 affixed to the boat 10 at the stern.

Figure 17:
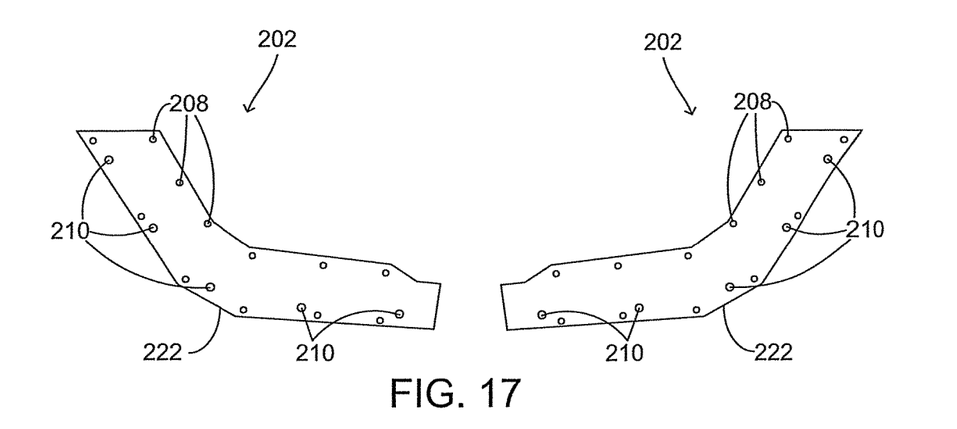
FIG. 17 is a back view of the port and starboard side base plates of the extendable devices.
Figure 18:
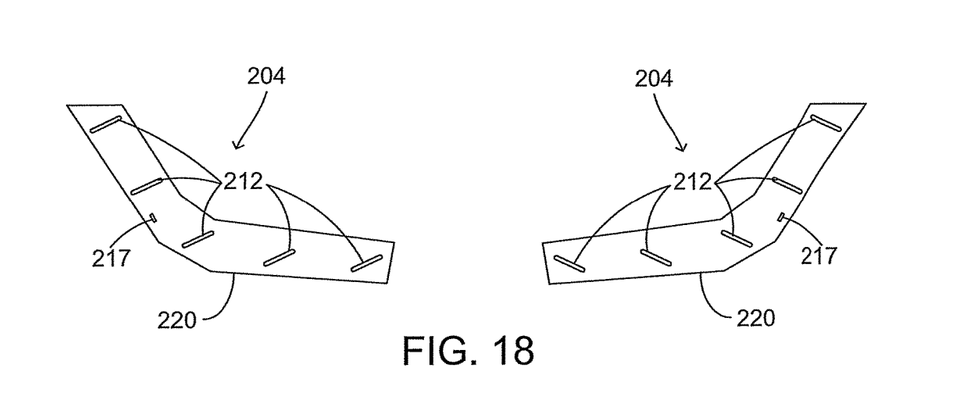
FIG. 18 is a back view of the port and starboard side extendable plates of the extendable devices.

Each extendable device 200 includes a base plate 202, an extendable plate 204 slidably mounted on the base plate 202, and an actuator 206 connected to the extendable plate 204. The base plate 202 includes a plurality of through holes 208 for attaching the base plate 202 to the boat 10 and a plurality of posts 210 extending substantially normal to the plane defined by the base plate 202. Each post 210 passes through a guide slot 212 formed completely through the extendable plate 204.

The guide slots 212 cooperatively operate with the posts 210 to guide the direction of displacement of the extendable plate 204 relative to the base plate 202. The guide slots 212 have an elongate direction that defines the amount by which the extendable plate 204 may be displaced relative to the base plate 202. The guide slots 212 are also positioned at an angle relative to horizontal that defines the direction the extendable plate 204 can be displaced.

The actuator 206 includes an axis and an extension arm 214 that extends outwardly from an actuator housing 216 and parallel to the axis when the actuator 206 is activated. The extension arm 214 is connected to the extendable plate 204 at an extension arm connection bracket 217. This connection is made using a conventional fastening mechanism such as a nut and bolt, welding, or the like.

The actuator 206 is adapted to move the extendable plate 204 relative to the base plate 202 in the direction defined by the guide slots 212. It is preferred that, relative to horizontal, the axis of the actuator 206 be substantially parallel to the elongate direction of the guide slots 212. The actuator 206 also includes an attachment member 218 adapted to connect the actuator 206 to the boat 10. The actuator 206 is in signal communication with the control system 120.

Each extendable plate 204 can be displaced relative to the base plate 202 by activating the actuator 206. When the extension arm 214 moves outwardly from the actuator housing 216 it causes the extendable plate 204 to slide substantially parallel to the plane defined by the base plate 202.

FIGS. 14-16 depict the boat 10 with a pair of extendable devices 200 attached at the transom 24 by securing the base plate 202 thereto using a securing mechanism such as bolts, screws, or the like.

FIG. 14 shows the extendable plate 204 in the stowed position. In the stowed position, the terminal edge 220 of the extendable plate 204 and the terminal edge 222 of the base plate 202 are substantially aligned along the same plane.

When the terminal edge 220 of extendable plate 204 is displaced relative to the base plate 202 in such a way that the terminal edge 220 of the extendable plate 204 is extended outwardly from the base plate 202 far enough to redirect the stream of water passing the hull 12, the extendable plate 204 is considered to be in the active position.

It is to be understood, however, that using a pair of extendable devices 200 is only a preferred configuration.

The base plates 202 are attached to the transom 24 such that their terminal edges 222 are adjacent to and mimic the contour of the transom's 24 periphery. In the stowed position, the extendable plates 204 do not extend beyond the transom 24 or sides 26a, 26b.

FIGS. 15 and 16 show the port side and starboard side extendable devices 200, respectively, in the active position. In the active position, the extendable plate 204 is extended outwardly along a plane that is substantially parallel to the plane defined by the transom 24 by extending the actuator's 206 extension arm 214. The distance the extendable plate 204 extends should be sufficient to redirect the flow of water past the hull 12.

In the embodiment shown, the terminal edge 220 of the extendable plate 204 in the active configuration extends beyond the bottom and the port and starboard sides, respectively. This arrangement is optimal when the transom 24 and the sides 26a, 26b meet to form an abrupt corner. However, when the transom 24 and sides 26a,26b meet to form a gradually rounded corner, it might not be necessary for the terminal edge 222 of the extendable plates 204 to extend beyond bottom or the port and starboard sides.

Referring back to FIG. 13, the extendable devices 200 are in operable communication with the control system 120, which includes a plate controller 161 that provides machine readable instructions to the control system 120 for controlling the extendable devices 200. The plate controller 161 controls the extendable devices 200 by receiving boat control information such as speed 132 and ballast tank levels 160.

The displacement of the extendable plates 204 is set by the plate controller 161. The extendable plates 204 may be extended incrementally. The operator may also select which extendable plate 204 should be placed into the active configuration.

Various modifications of the embodiments described here can be made without departing from the spirit and scope of the invention as described above and as defined in the appended claims.

That which is claimed is:

1. A watersports boat comprising:
   a hull having an underside extending from a forward bow to an aft transom along a longitudinal centerline, the underside defining a running surface that contacts the water when the hull moves therein, an aft running surface section of the hull having:
     an extension member forming a re-positionable aft running surface section; and
     a non-repositionable aft running surface section located forward of the re-positionable aft running surface section;
   an actuator connected to the re-positionable aft running surface section; and
   a control system in communication with the actuator to reposition the re-positionable aft running surface section;
   a boat engine for driving the watersports boat; and
   at least one ballast tank
   wherein the control system includes a controller and an operating setting input unit, the controller configured to reposition the extension member based on inputs received by the operating setting input unit;
   wherein the operating setting input unit includes:
     an extension member auto deploy input, the controller automatically adjusting a position of the extension member as the watersports boat accelerates when in an auto deploy mode; and
     an intensity level setting input, the intensity level setting input determining a rate at which the position of the extension member is adjusted while operating in the auto deploy mode;
   wherein the control system further includes a boat operating parameters unit, the boat operating parameters unit receiving inputs of at least boat speed and ballast tank level; and
   wherein, in the auto deploy mode, the controller is configured to automatically reposition the extension member based on the boat speed and ballast tank level inputs.

2. The watersports boat of claim 1, wherein the extension member has a forward edge and first and second repositionable side edges extending aft therefrom at respective acute angles.

3. The watersports boat of claim 2, wherein the non-repositionable aft running surface has an aft edge and first and second non-repositionable side edges extending forwardly therefrom at respective obtuse angles.

4. The watersports boat of claim 3, wherein respective aft ends of the first and second repositionable side edges are located adjacent respective forward ends of the first and second non-repositionable side edges.

5. The watersports boat of claim 4, wherein the respective acute angles and the respective obtuse angles are supplementary.

6. The watersports boat of claim 3, wherein the longitudinal centerline crosses the extension member.

7. The watersports boat of claim 6, wherein the extension member is rotatable about a rotation axis perpendicular to the centerline.

8. The watersports boat of claim 7, wherein the rotation axis lies along a forward edge of the extension member.

9. The watersports boat of claim 1, wherein the operating setting input unit further includes:
   an extension member set point input, the controller repositioning the extension member to an operator defined position once a desired speed of the watersports boat has been reached when in an extension member set point operational mode.

10. The watersports boat of claim 9, wherein the controller is configured to automatically shift between the auto deploy mode to the extension member set point operation mode once the desired speed is reached.

11. The watersports boat of claim 10, wherein the control system further includes an engine speed control device coupled to the boat engine, and the operating setting input unit further includes a speed control input, the controller automatically setting the desired speed using the engine speed control device when speed control is on.

12. The watersports boat of claim 1, wherein, in the auto deploy mode, the controller is configured to automatically lower a movement range of the extension member if the ballast tank level input is below a predetermined threshold.

13. The watersports boat of claim 1, further comprising an opposed pair of extendable plates configured to move between a stowed position and an active position wherein, in the stowed position, a terminal edge of each stowed extendable plate is located such that it does not substantially redirect water flowing aft past the transom, and, in the active position, the terminal edge of each extendable plate is located such that it does redirect water flowing aft past the transom.

14. The watersports boat of claim 13, wherein the control system is further configured to move the extendable plates.

* * * * *